United States Patent
Loce et al.

(10) Patent No.: US 8,957,788 B2
(45) Date of Patent: Feb. 17, 2015

(54) VEHICLE REVERSE DETECTION METHOD AND SYSTEM VIA VIDEO ACQUISITION AND PROCESSING

(75) Inventors: Robert P. Loce, Webster, NY (US); Wencheng Wu, Webster, NY (US); Edgar A. Bernal, Webster, NY (US); Thomas F. Wade, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 560 days.

(21) Appl. No.: 13/283,792

(22) Filed: Oct. 28, 2011

(65) Prior Publication Data

US 2013/0106595 A1 May 2, 2013

(51) Int. Cl.
| | |
|---|---|
| *G08G 1/056* | (2006.01) |
| *G06K 9/00* | (2006.01) |
| *G06T 7/20* | (2006.01) |
| *G06K 9/46* | (2006.01) |

(52) U.S. Cl.
CPC ............ *G06K 9/00805* (2013.01); *G08G 1/056* (2013.01); *G06T 7/2033* (2013.01); *G06K 9/4661* (2013.01); *G06K 9/00825* (2013.01); *G06T 2207/30236* (2013.01)
USPC ........... 340/937; 340/438; 348/149; 382/104; 382/105; 382/107

(58) Field of Classification Search
USPC .................. 340/438, 463, 937; 348/148, 149; 382/104, 105, 107
See application file for complete search history.

(56) References Cited

U.S. PATENT DOCUMENTS 7,580,547 B2 * 8/2009 Benhammou ................. 382/103

FOREIGN PATENT DOCUMENTS

| CN | 102184547 A | | 9/2011 |
|---|---|---|---|
| GB | 2447133 A | * | 9/2008 |

OTHER PUBLICATIONS

UK Intellectual Property Office; 1 page, dated Feb. 8, 2013, Search Report.

* cited by examiner

*Primary Examiner* — Brian Zimmerman
*Assistant Examiner* — Sara Samson
(74) *Attorney, Agent, or Firm* — Fay Sharpe LLP

(57) ABSTRACT

This disclosure provides a video camera and video processing alert system for detecting a vehicle in reverse. According to one exemplary embodiment, the system operates according to the following guidelines or steps: (1) Acquire video containing features relevant to reverse detection, (2) Identify feature(s) within the video frame that are relevant to a vehicle in reverse, (3) Examine identified features to extract the evidence of vehicle backing up for a current frame, (4) Apply temporal filtering on the frame-to-frame evidence, (5) Use filtered evidence for decision on triggering the alarm, (6) Triggering an alarm if indicated by the decision. The system can be implemented with relative low cost and complexity, due to the affordability of video cameras, and the fact that many drive-through locations have existing video capture infrastructure.

19 Claims, 4 Drawing Sheets

VEHICLE REVERSE DETECTION METHOD AND SYSTEM VIA VIDEO ACQUISITION AND PROCESSING

BACKGROUND

Common vehicle reverse prevention methods are classified as STD (Severe Tire Damage) devices. They are often employed in high security areas and use blades or spikes to prevent a vehicle from travelling the wrong way in a particular lane. These destructive methods are unsuitable for use with patrons in drive-through lanes, as well as other scenarios on streets and highways where a non-destructive reverse detection system may be needed or required. A near instantaneous non-destructive system is needed.

BRIEF DESCRIPTION

In one embodiment of this disclosure, described is a method of detecting a vehicle is reversing using a video camera directed towards the vehicle and operatively connected to a video processing system, the method comprising a) acquiring a video stream including a set of one or more features of the vehicle, the video including a current frame and one or more sequential past frames; b) selecting a first feature from the set of one or more features; c) processing the selected first feature captured in the current frame relative to one or more of the sequential past frames and determining if the vehicle is reversing; and, d) triggering an alarm if the vehicle is reversing.

In another embodiment of this disclosure, described is a method of detecting a vehicle is reversing using a video camera directed towards the vehicle and operatively connected to a video processing system, the method comprising a) acquiring a video stream of the vehicle including a current frame and one or more sequential past frames; b) processing the acquired video stream of the vehicle and determining if the vehicle is reversing; and c) triggering an alarm if the vehicle is reversing.

In yet another embodiment of this disclosure, described is a video system for triggering an alarm when a vehicle is reversing, the video system comprising a video camera directed towards the rear of a vehicle in a drive-through lane, the video camera positioned to enable viewing of back-up lights associated with the vehicle; and a video processing system operatively connected to the video camera, the video processing system configured to perform a method comprising a) acquiring a video stream including a set of one or more features of the vehicle, the video including a current frame and one or more sequential past frames; b) selecting a first feature from the set of one or more features; c) processing the selected first feature captured in the current frame relative to one or more of the sequential past frames and determining if the vehicle is reversing; and, d) triggering an alarm if the vehicle is reversing.

In still another embodiment of this disclosure, described is a video system for triggering an alarm when a vehicle is reversing, the video system comprising a video camera directed towards the vehicle; and a video processing system operatively connected to the video camera, the video processing system configured to perform a method comprising a) acquiring a video stream of the vehicle including a current frame and one or more sequential past frames; b) processing the acquired video stream of the vehicle and determining if the vehicle is reversing; and c) triggering an alarm if the vehicle is reversing.

DETAILED DESCRIPTION

Figure 1:
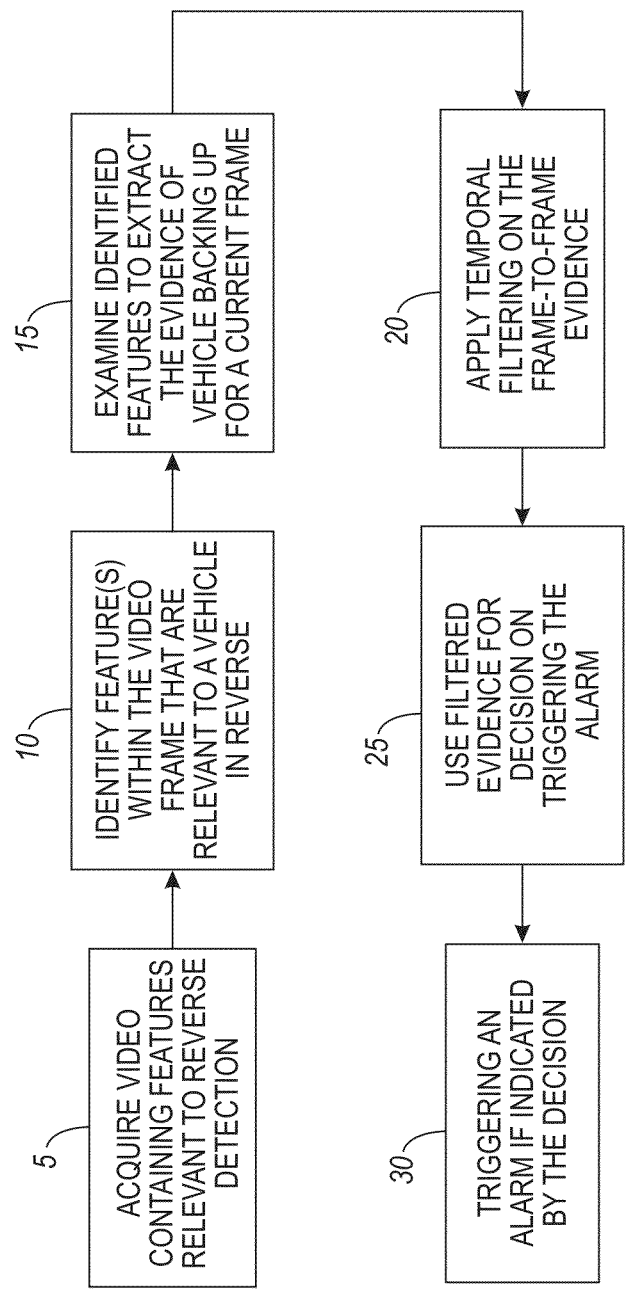
FIG. 1 is a block diagram of a method of detecting a vehicle is reversing according to an exemplary embodiment of this disclosure.

This disclosure provides a video camera and video processing alert system for detecting a vehicle in reverse. The system operates according to the following guidelines or steps: (1) Acquire video containing features of a vehicle relevant to reverse detection, (2) Identify feature(s) within the video frame that are relevant to a vehicle in reverse, (3) Examine identified features to extract the evidence of vehicle backing up for a current frame, (4) Apply temporal filtering on the frame-to-frame evidence, (5) Use filtered evidence for decision on triggering the alarm, (6) Triggering an alarm if indicated by the decision. The system can be implemented with relative low cost and complexity, due to the affordability of video cameras, and the fact that many drive-through locations such as restaurants, toll booths, etc., have existing video capture infrastructure.

As discussed in the Background Section, many accidents occur in drive-through lanes, for example fast food restaurants, due to drivers unintentionally putting their vehicle in reverse. In addition to minor vehicle damage, the incidents can escalate to major damage and violence. These incidences can be very detrimental to businesses due to property damage, physical injuries, lawsuits, and bad publicity. An inexpensive means to reduce the number of these incidences can be of significant value to an establishment with drive-through lanes and the potential market is very large. For instance, one fast food chain alone has over 31,000 stores. Many drive-through lanes are currently equipped with a video camera infrastructure for security or order-matching purposes, and a reverse detection feature adding to that infrastructure should not encounter any key barriers.

Common vehicle reverse prevention methods are classified as STD (Severe Tire Damage). They are often employed in high security areas and use blades or spikes to prevent a vehicle from travelling the wrong way in a particular lane. These destructive methods are unsuitable for use with patrons in drive-through lanes. Some vehicles are being equipped with proximity detectors that will detect if an object is directly behind or in front of the vehicle. One example is the Proxel parking sensor (see http://www.proxel.com). These sensors are on a very limited number of vehicles. What is needed is a near-instantaneous, non-destructive system for detecting a vehicle in reverse that works for all vehicles regardless of their features, cost, year of production, etc.

This disclosure provides a video camera and video processing alert system for detecting a vehicle in reverse. According to one exemplary embodiment, the system operates according to the following guidelines or steps: (1) Acquire video containing features relevant to reverse detection, (2) Identify feature(s) within the video frame that are relevant to a vehicle in reverse, (3) Examine identified features to extract the evidence of vehicle backing up for a current frame, (4) Apply temporal filtering on the frame-to-frame evidence, (5) Use filtered evidence for decision on triggering the alarm, (6) Triggering an alarm if indicated by the decision. The system can be implemented with relative low cost and complexity, due to the affordability of video cameras, and the fact that many locations have existing video capture infrastructure.

Notably, the systems and methods herein are described, for the most part, are applied to a drive-through lane associated with a fast food restaurant or toll booth. However, it is to be understood the reverse detection systems and methods provided herein are applicable to any environment where it is desirable to detect the reversing of a vehicle, for example, but not limited to, a drive-through loading area, a parking gate, etc.

Moreover, the systems and methods herein are described primarily with a single video camera directed to the rear of a single vehicle and, optionally, or in the alternative, a video camera directed towards the top of a vehicle. However, it is to be understood the systems and methods disclosed can include multiple video cameras to monitor a plurality of vehicles, for example, a queue of vehicles waiting to pass a booth or gate and/or a window.

Below is provided further details of a video camera and video processing alert system for detecting a vehicle in reverse.

Step 1: Acquire Video Containing Features Relevant to Reverse Detection 5.

Video is acquired using any of a variety of camera types. Low-cost RGB, IR, or monochrome video cameras are examples of suitable devices. Notably, RGB cameras can be used to search for red brake lights on the rear of a vehicle to aid in locating activated white reverse lights which indicate a vehicle may be reversing.

A camera must be positioned so as to enable it to capture the relevant features at the location where reverse driving must be avoided. For instance, if the primary features of interest are the back-up lights, the camera should be aimed toward the back of the vehicle so the reverse lights are within the field of view. In addition, the camera needs to be positioned to provide a non-obstructed view of the rear of the vehicle taking into account any trailing vehicle which may be present directly behind the subject vehicle. One camera could view one or more lanes and could be performing other functions such as license plate recognition for purposes such as security or matching an order to a customer. Another useful position for the camera is above the lane, viewing substantially downward. This viewing configuration enables robust reverse motion tracking and detection of vehicle features and is less dependent on color information. Importantly, the location of the video camera(s) can be optimized to provide a robust line of sight to the reverse lights of a subject vehicle or any other vehicle feature. For example, the video camera may be mounted on a vertical wall/pole, under a canopy, etc.

Step 2: Identify Feature(s) within the Video Frame that are Relevant to Vehicle Backing Up 10.

There are multiple options for selecting features for reverse movement detection. According to one exemplary embodiment, reverse lights are tracked for several reasons. A camera viewing the back of a vehicle can also view a license plate for other applications. Detection of bright spots associated with the reverse lights in a particular zone is relatively robust, especially since the detection would often be made in a drive-through including a car port which provides shade that prevents undesired sun glare. Also, detection of bright spots readily allows for a rapid real-time response to a reverse condition. Other vehicle features include features that are easy to identify in an image and that can be tracked for motion or size differences, frame to frame. For example, from a top view, the profile of a vehicle including an edge or corner can be reliably tracked for motion. From the rear, the license plate, bumper regions, etc. can be tracked for size or motion. Below are described details of one implementation of detecting bright spots caused by reverse lights.

Bright spots having certain characteristics (intensity, size, shape, location etc.) which can be used as an initial indicator of the possible occurrence of a vehicle reversing. The idea behind this is that the reverse lights are on when the vehicle is in reverse. To identify the relevant bright spot features, each video frame is analyzed using the following algorithm:

Initially, identify red regions within a pre-specified size range, i.e. look for possible brake lights.

If red regions exist, identify only bright spots that are near the red regions. Presumably the bright spots near the red regions are associated with the reverse lights.

If there is no red region, identify all bright spots in the image frame. For example, identify bright spots by finding contiguous pixels meeting one or more of the following requirements.

Pixel intensity=$(4R+4G+2B)/10$>$TH_L$ (lower weight on B to bias toward yellow for aged reverse light lens), where R, G, and B are typically represented by 8 bits and have values ranging from 0-255.

Size of the contiguous area is within $[s_1, s_2]$.

Aspect ratio of the bounding box of the contiguous area is within $[a_1, a_2]$ (shape factor).

Figure 2:
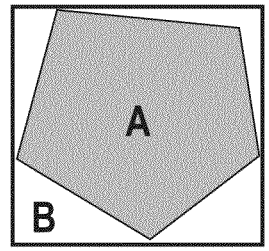
FIG. 2 illustrates one example of determining the compactness of an image captured by a video camera, used to identify back-up lights associated with a vehicle.

Compactness of the contiguous area is within $[c_1, c_2]$ (compactness is the fraction of bright spot in its bounding box, see FIG. 2).

Figure 3:
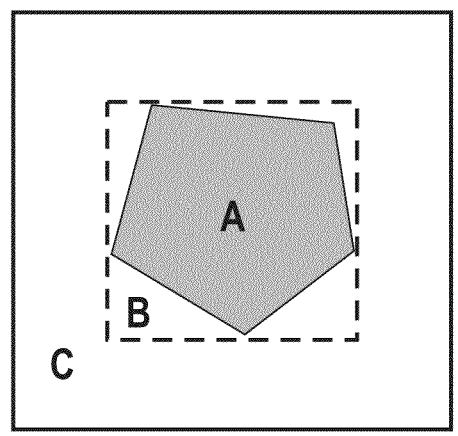
FIG. 3 illustrates one example of determining local contrast of an image captured by a video camera, used to identify back-up lights associated with a vehicle.

Local "contrast">TH, (see FIG. 3). Note that the bounding box is expanded by a factor of 2 in the x-y direction to have a more robust measure if local contrast.

Note that false positives can occur when assuming bright spots are due to reverse lights when there are highly reflective objects in the scene, such as shiny metal surfaces or snow. An optional background subtraction step can eliminate most of these potential false positives.

Step 3: Examine Identified Features to Extract the Evidence of Vehicle Backing Up for a Current Frame 15.

Evidence that a vehicle is backing up comes from two sources:

The presence of a pair of bright spots that are likely to be the reverse lights, and any single bright spot traveling backward farther than a pre-specified distance, for example 10-15 cm.

The presence of a pair of bright spots is determined within a single frame as the video frames stream in. The determination of the presence of the pair is based on examining all the detected bright spots from Step 2 and the characteristics of the following:

The x and y distances between a pair of back-up lights has to be within a pre-determined range.

The sizes of a pair of back-up lights have to be similar, and optionally the image content around the pair of back-up lights has to be similar.

To determine whether any single bright spot is traveling backward, any single bright spots of interest are tracked over time and the total distances travelled up to the current frame pre-assessed. For example, a simple tracking algorithm (for real-time implementation) that first matches bright spots locally frame-to-frame (i.e., assume the speed of the vehicle is <10 mph) and then assesses whether the distance travelled is larger than $TH_m$, for example, but not limited to 10-15 cm, (assign backward as positive direction) based on the movement of the center of bright spots over time. Alternatively, $TH_m$ can represent pixel distance as measured at the camera. For a given frame, the evidence decision is "one" if one of the two sources is true; otherwise, the evidence decision is "zero." A running buffer of pre-determined length is used to store the evidence vector (a vector of 0s and 1s). Notably, the evidence vector is formed from evidence decisions from multiple frames, preferably successive frames.

Step 4: Apply Temporal Filtering on the Frame-to-Frame Evidence

In order to remove some of the false positives that may have occurred in Step 2 and 3, temporal filtering can be applied on the tracked evidence vector. For example, median filtering can be applied with sliding window sizes of $N_1$ and $N_2$ ($N_1 < N_2$) to the evidence vector. Note that with this temporal filtering method, the length of the running buffer required for evidence vector is at least $N_2$.

Step 5: Use Filtered Evidence for Decision on Triggering the Alarm 25.

To trigger an alarm, two-level alarm triggering (warning or stop) can be used based on the results of the aforementioned temporally filtered evidence vectors. In other words, the two-level alarm is based on the confidence of the evidence vector that a vehicle is reversing.

For example, if the median of the latest $N_2$ evidences is 1, a "stop" signal is triggered.

If the median of the latest $N_2$ evidences is 0, then a "warning" signal is triggered, if the median of the latest $N_1$ evidence is 1, otherwise, no signal is triggered.

Conceptually, a "stop" signal is triggered if the majority of the recent $N_2$ evidences is "yes, indicating the vehicle is backing up". A "warning" signal is triggered if the signal is not "stop" due to the majority of $N_2$ evidences not indicating the "vehicle is backing up" and if the majority of the recent $N_1$ evidences indicates "yes, the vehicle is backing up". By setting $N_1 < N_2$, the algorithm requires stronger evidence to issue a "stop" signal than to issue a "warning" signal. Note that there is a trade-off between choosing larger N's to reduce false-positives and choosing smaller N's (at least $N_1$) to have shorter response time (since there is no trigger signals until we have gathered at least $(N_1+1)/2$ evidences). Note also that the choice of $N_1$ and $N_2$ also depends on the quality of the detectors in step #2 & #3, which includes factors such as frame rate, noise and dynamic range of the sensors.

Step 6: Triggering an Alarm if Indicated by the Decision 30.

According to one exemplary embodiment, an actual alarm is an illuminated sign with an audible alarm.

To illustrate the effectiveness of the disclosed system and method, five 240×320 30 fps outdoor videos with a close-up view of a vehicle moving forward and backward were acquired and analyzed. The algorithm described hereto was implemented in MATLAB with parameters: $(TH_L, s_1, s_2, a_1, a_2, TH_c, TH_m, N_1, N_2) = (170, 10, 240, 0.5, 3, 0.4, 80, 10, 7, 15)$ for processing all five videos, where $TH_m$ is represented in pixels. Other than a few short moments of false positives (false alarm), the method correctly identified all the events of vehicle backing up in these videos. From the perspective of real-time processing, it took the MATLAB implementation 523 seconds to process 5834 frames (~195 seconds in real-time), of which 188 seconds were used to write out the resulting videos for illustration. Notable, this is not needed for the actual application. 34 seconds were used to read and buffer all the video frames, which will be less in real-time due to video streaming. Hence, the actual processing was about 301 seconds for processing 195 seconds videos. The gap to real-time processing and decision making is less than a factor of two, which can be easily accomplished with parallel processing and/or a C/C++ implementation.

Additional considerations for the disclosed methods and system include the following.

The majority of current false-alarms come from the snow in the background and the glare on the body of the vehicle due to the sun and the angle of the camera. These will not be issues in an indoor or car port scenario.

The parameters such as size range and the distance range between a pair of lights can be tightened if the videos are acquired with fixed settings. For the implementation disclosed here, some variations were allowed to better test the robustness of the algorithm. The latitude of configurations considered likely exceeds the latitude of a real-life application. Hence, it is expected that better performance is achievable in this regard.

With $N_1=7$ frames, a "warning" was not issued unless 4 or more frames included evidence of a car backing up, i.e., a bit more than half of N. This translates to 0.13 seconds for 30 fps video, or a distance of 2 feet if the vehicle speed is 10 mph. If a reduction of this lag is desired, for example, for vehicles moving at higher speeds, $N_1$ needs to be reduced while improving the detection effectiveness to avoid too many false positives. Similarly, one can derive the requirement for $N_2$, which was set at 15 for the implementation described herein. Alternatively, a camera with a higher frame rate can reduce the lag for a given $N_1$. Frame rates of 60 fps and 72 fps are currently quite common and can reduce the lag by 2× or more.

$TH_m=10$ pixels was used for distance travelled before we issue an evidence of vehicle backing up. This corresponds to about a foot for the example configuration. This can be reduced for a faster response but that may lead to an increase in the false positive rate. Note that travelling backward is only the auxiliary evidence when a pair of reverse lights is not detected. Hence for the most part, it does not affect the response time on the five videos tested.

The camera system can also recognize and record license plates for purposes such as gathering customer statistics or Amber Alert.

Special illumination and shading can be provided to prevent false positive due to highly reflective objects in the field of view such as metal and snow.

A wavelength band, such as Near Infra Red (NIR) can be used to make the method less sensitive to environmental conditions and ambient lighting.

Figure 4:
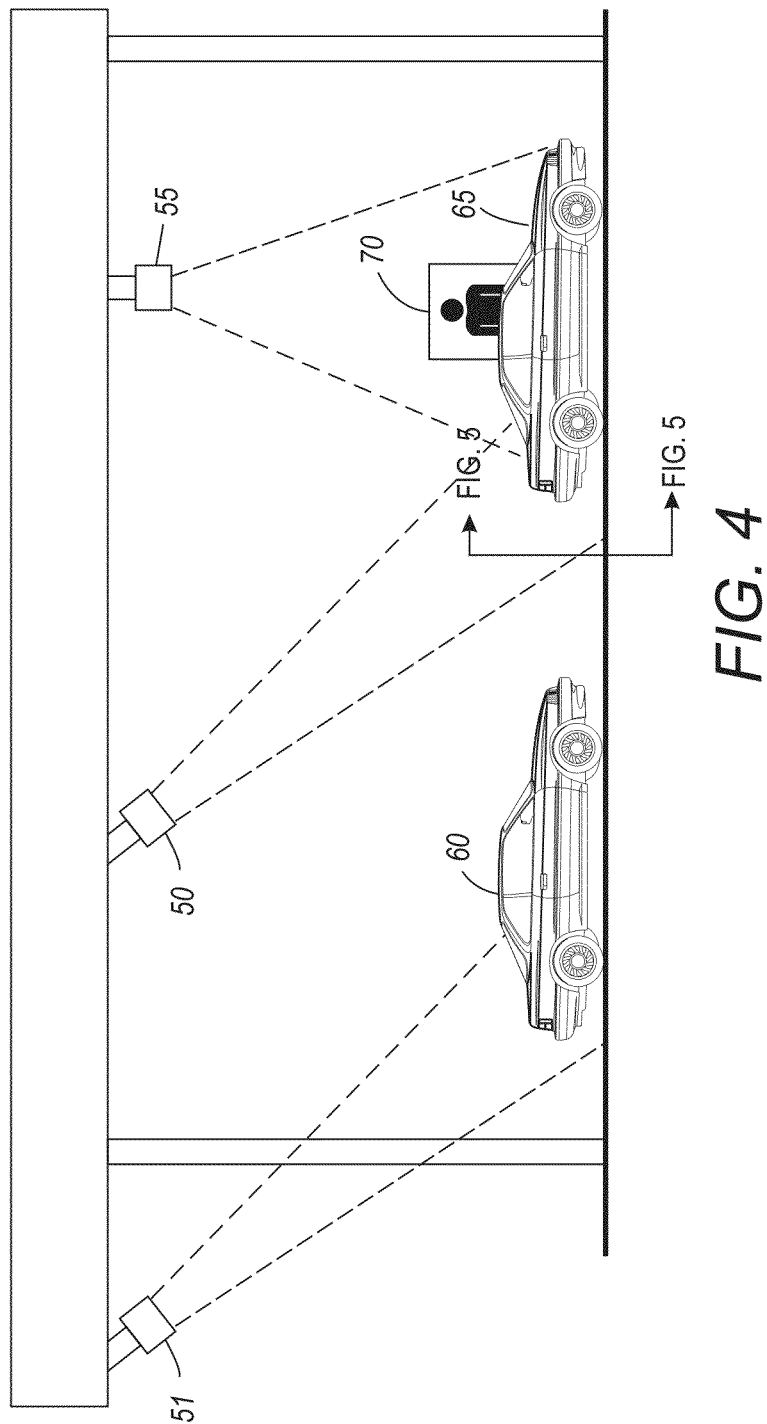
FIG. 4 illustrates an exemplary embodiment of a video system installed at a one-way drive-through used to trigger an alarm when a vehicle is reversing.
Figure 5:
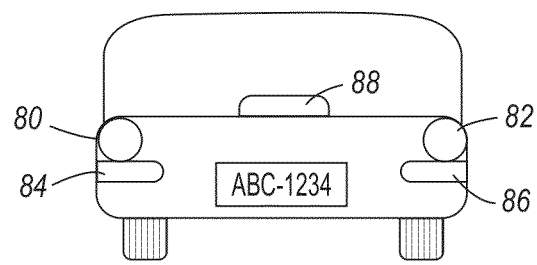
FIG. 5 illustrates a rear view of the vehicle being monitored in FIG. 4.
Figure 6:
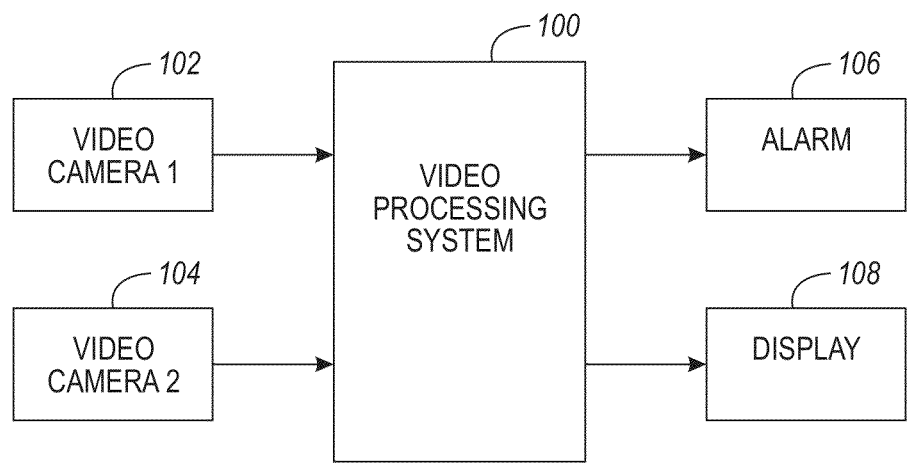
FIG. 6 is a block diagram of a video system according to an exemplary embodiment of this disclosure.

With reference to FIGS. 4, 5 and 6, illustrated is a reverse detection system according to an exemplary embodiment of this disclosure. The reverse detection system includes a first rear looking video camera 50, an optional second rear looking video camera 51, an optional overhead video camera 55, a drive-through window 70, a lead vehicle 65 and a trailing vehicle 60.

FIG. 5 is a rear view of vehicles 60 and 65, which includes stopping lamps 80, 82 and 88, and reversing lamps 84 and 86. As previously discussed, video camera 50 is directed to the rear of the lead vehicle 65 to capture and process video frames including at least one of the reversing lamps 84 and 86.

FIG. 6 is a block diagram of a reverse detection video processing system according to an exemplary embodiment of this disclosure. The reverse detection system including video camera 1 102, video camera 2 104, audible alarm 106 and a display 108, such as an LED display, directed towards the driver of a lead vehicle in a drive-through. The video camera 1 102 and video camera 2 104 provide image frames video processing system 100 which processes the video streams and drives alarm 106 and display 108.

It is to be understood the video processing system 100 can include any of a plurality of available hardware/software configurations available. For example, a processor based platform including accessible memory to execute computer readable/processor readable instructions to execute the reverse detection methods disclosed herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of detecting a vehicle is reversing using a video camera directed towards the vehicle and operatively connected to a video processing system, the method comprising:
   a) acquiring a video stream including a set of one or more features of the vehicle, the video including a current frame and one or more sequential past frames;
   b) selecting a first feature from the set of one or more features;
   c) processing the selected first feature captured in the current frame relative to one or more of the sequential past frames and determining if the vehicle is reversing; and
   d) triggering an alarm if the vehicle is reversing,
   wherein step c) comprises:
   1) processing the selected first feature captured in the current frame relative to one or more of the sequential past frames and determining if the vehicle is reversing;
   2) generating an evidence vector associated with the current frame and one or more of the sequential past frames, the evidence vector associating the current frame and the one or more sequential past frames with the determination if the vehicle is reversing in step c1), and
   3) applying temporal filtering, wherein the temporal filtering includes median filtering with sliding window sizes of $N_1$ and $N_2$ frames, where $N_1 < N_2$, applied to the evidence vector, and
   step d) comprises:
   triggering a stop alarm if the median of a latest $N_2$ frames indicates the vehicle is reversing, and triggering a warning alarm if the median of a latest $N_1$ frames indicates the vehicle is reversing, but the latest set of $N_2$ frames does not indicate the vehicle is reversing.

2. The method of detecting a vehicle is reversing according to claim 1, wherein the set of one or more features includes one or more of a brake light, a reversing light, a license plate, a decal, a running light, and a reflective object.

3. The method of detecting a vehicle is reversing according to claim 1, wherein the selected first feature is a bright spot associated with the vehicle, and step c) processes the bright spot to determine if the bright spot is traveling towards the video camera, indicating the vehicle is reversing.

4. The method of detecting a vehicle is reversing according to claim 1, comprising:
   step b) selecting a first and second feature from the set of one or more features; and
   step c) processing the selected first and second features captured in the current frame and determining the vehicle is reversing if either the first or second feature is reversing relative to one or more of the sequential past frames.

5. A method of detecting a vehicle is reversing using a video camera directed towards the vehicle and operatively connected to a video processing system, the method comprising:
   a) acquiring a video stream including a set of one or more features of the vehicle, the video including a current frame and one or more sequential past frames;
   b) selecting a first feature from the set of one or more features;
   c) processing the selected first feature captured in the current frame relative to one or more of the sequential past frames and determining if the vehicle is reversing; and
   d) triggering an alarm if the vehicle is reversing,
   wherein the first feature is a bright spot near a red region associated with a brake light.

6. A method of detecting a vehicle is reversing using a video camera directed towards the vehicle and operatively connected to a video processing system, the method comprising:
   a) acquiring a video stream including a set of one or more features of the vehicle, the video including a current frame and one or more sequential past frames;
   b) selecting a first feature from the set of one or more features;
   c) processing the selected first feature captured in the current frame relative to one or more of the sequential past frames and determining if the vehicle is reversing; and
   d) triggering an alarm if the vehicle is reversing,
   wherein the first feature is a bright spot selected by processing the acquired video stream to identify one or more of a) contiguous pixels of an intensity greater than $TH_L$ within a predetermined contiguous area, b) contiguous pixels covering a predetermined area, c) contiguous pixels covering a predetermined shape and d) contiguous pixels at a predetermined location on the vehicle.

7. The method of detecting a vehicle is reversing according to claim 6, the bright spot selected by further processing of the acquired video stream wherein an aspect ratio of a bounding box of the predetermined contiguous area is within a predetermined shape, a compactness of the predetermined contiguous area is within a predetermined fraction, and a local contrast is greater than $TH_L$.

8. A method of detecting a vehicle is reversing using a video camera directed towards the vehicle and operatively connected to a video processing system, the method comprising:
   a) acquiring a video stream of the vehicle including a current frame and one or more sequential past frames;
   b) processing the acquired video stream of the vehicle and determining if the vehicle is reversing; and
   c) triggering an alarm if the vehicle is reversing,
   wherein step b) comprises:
   b1) determining a profile of the vehicle for the current frame and one or more of the one or more sequential past frames; and
   b2) tracking the profiles of step b1) frame by frame to determine if the vehicle is reversing, and
   wherein step b2 comprises:
   b2.1) tracking the profile over time;
   b2.2) calculating a total distance traveled by the profile up to the current frame;
   b2.3) comparing the total distance traveled to a predetermined limit $TH_M$; and b2.4) determining the vehicle is reversing if the total distance traveled is greater than $TH_M$.

9. The method of detecting a vehicle is reversing according to claim 8, wherein the profile of the vehicle is an image which provides an outline of the vehicle relative to the video camera.

10. The method of detecting a vehicle is reversing according to claim 8, wherein the video camera is directed towards a rear of the vehicle, and step b2) determining the vehicle is reversing if the current frame includes a larger signature profile relative to one or more of the one or more sequential past frames.

11. The method of detecting a vehicle is reversing according to claim 8, comprising:
b3) applying temporal filtering.

12. The method of detecting a vehicle according to claim 8, wherein the alarm is one or more of an audible sound and a visual display directed to an operator of the vehicle.

13. The method of detecting a vehicle according to claim 8, step b) further comprising:
processing the acquired video of the vehicle to identify a license plate number associated with the vehicle.

14. A method of detecting a vehicle is reversing using a video camera directed towards the vehicle and operatively connected to a video processing system, the method comprising:
a) acquiring a video stream of the vehicle including a current frame and one or more sequential past frames;
b) processing the acquired video stream of the vehicle and determining if the vehicle is reversing; and
c) triggering an alarm if the vehicle is reversing,
wherein step b) comprises:
b1) processing the acquired video stream of the vehicle and determining if the vehicle is reversing;
b2) generating an evidence vector associated with the current frame and one or more of the sequential past frames, the evidence vector associating the current frame and the one or more sequential past frames with the determination if the vehicle is reversing in step b1), and
b3) applying temperal filtering,
wherein the temporal filtering includes median filtering with sliding window sizes of $N_1$ and $N_2$ frames, where $N_1<N_2$ applied to the evidence vector, and
wherein step c) comprises:
triggering a stop alarm if the median of a latest $N_2$ frame indicates the vehicle is reversing, and triggering a warning alarm if the median of a latest $N_1$ frames indicates the vehicle is reversing, but the latest set of $N_2$ frames does not indicate the vehicle is reversing.

15. A video system for triggering an alarm when a vehicle is reversing, the video system comprising:
a video camera directed towards the rear of a vehicle in a drive-through lane, the video camera positioned to enable viewing of back-up lights associated with the vehicle; and
a video processing system operatively connected to the video camera, the video processing system configured to:
a) acquire a video stream including a set of one or more features of the vehicle, the video including a current frame and one or more sequential past frames;
b) select a first feature from the set of one or more features;
c) process the selected first feature captured in the current frame relative to one or more of the sequential past frames and determining if the vehicle is reversing; and,
d) trigger an alarm if the vehicle is reversing,
wherein step c) comprises:
1) processing the selected first feature captured in the current frame relative to one or more of the sequential past frames and determining if the vehicle is reversing;
2) generating an evidence vector associated with the current frame and one or more of the sequential past frames, the evidence vector associating the current frame and the one or more sequential past frames with the determination if the vehicle is reversing in step c1); and
3) applying temporal filtering,
wherein the temporal filtering includes median filtering with sliding window sizes of $N_1$, and $N_2$ frames, where $N_1<N_2$, applied to the evidence vector, and
step d) comprises:
triggering a stop alarm if the median of a latest $N_2$ frames indicates the vehicle is reversing, and triggering a warning alarm if the median of a latest $N_1$ frames indicates the vehicle is reversing, but the latest set of $N_2$ frames does not indicate the vehicle is reversing.

16. The video system according to claim 15, wherein the set of one or more features includes one or more of a brake light, a reversing light, a license plate, a decal, a running light, and a reflective object.

17. The video system according to claim 15, wherein the selected first feature is a bright spot associated with the vehicle, and step c) processes the bright spot to determine if the bright spot is traveling towards the video camera, indicating the vehicle is reversing.

18. A video system for triggering an alarm when a vehicle is reversing, the video system comprising:
a video camera directed towards the vehicle; and
a video processing system operatively connected to the video camera, the video processing system configured to perform a method comprising:
a) acquiring a video stream of the vehicle including a current frame and one or more sequential past frames;
b) processing the acquired video stream of the vehicle and determining if the vehicle is reversing; and
c) triggering an alarm if the vehicle is reversing,
wherein step b) comprises:
b1) determining a profile of the vehicle for the current frame and one or more of the one or more sequential past frames; and
b2) tracking the profiles of step b1) frame by frame to determine if the vehicle is reversing, and
wherein step b2) comprises:
b2.1) tracking the profile over time;
b2.2) calculating a total distance traveled by the profile up to the current frame;
b2.3) comparing the total distance traveled to a predetermined limit $TH_M$; and
b2.4) determining the vehicle is reversing if the total distance traveled is greater than $TH_M$.

19. The video system according to claim 18, wherein the profile of the vehicle is an image which provides an outline of the vehicle relative to the video camera.

* * * * *